G. WHEELER.
HOG-ELEVATOR.
No. 192,723. Patented July 3, 1877.
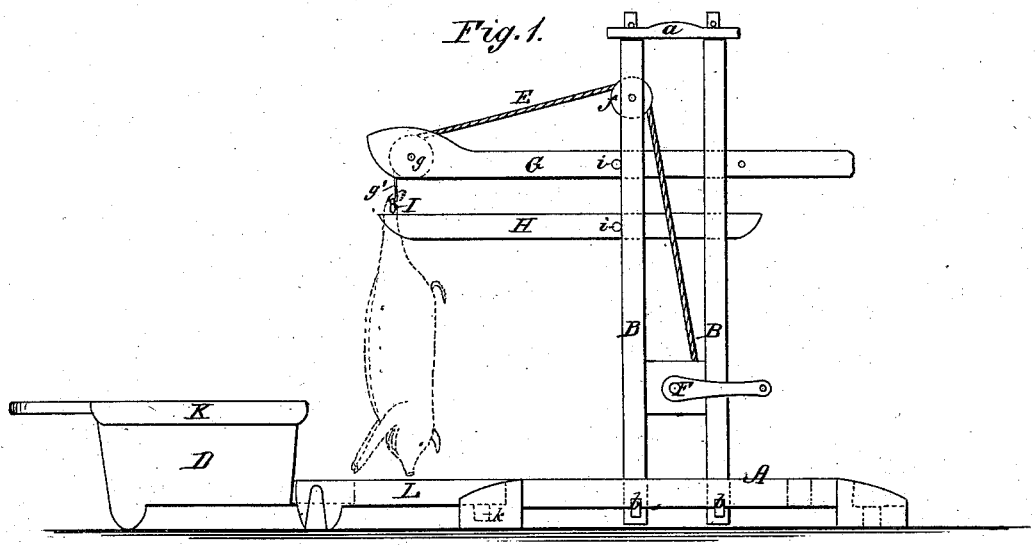
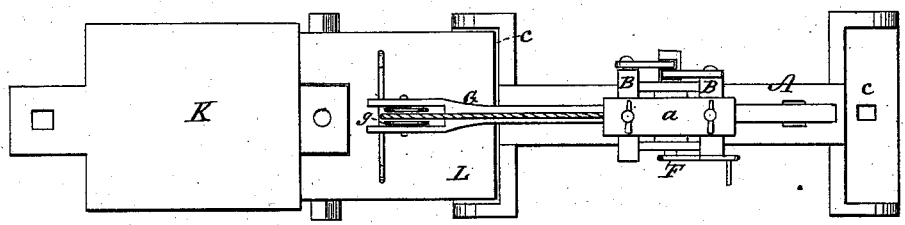
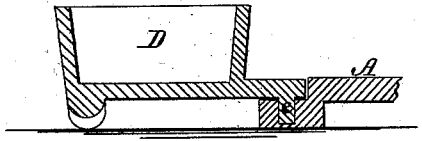
WITNESSES:
W. W. Hollingsworth
INVENTOR:
George Wheeler
BY
ATTORNEYS.

UNITED STATES PATENT OFFICE.

GEORGE WHEELER, OF NEWARK, OHIO.

IMPROVEMENT IN HOG-ELEVATORS.

Specification forming part of Letters Patent No. 192,723, dated July 3, 1877; application filed March 15, 1877.

To all whom it may concern:

Be it known that I, GEORGE WHEELER, of Newark, in the county of Licking and State of Ohio, have invented a new and Improved Apparatus for Dressing Swine and Bullocks; and I do hereby declare that the following is a full, clear, and exact description of the same.

The invention is embodied in the construction and arrangement of parts, as hereinafter described and claimed.

In the accompanying drawing, forming part of this specification, Figure 1 is a side elevation, and Fig. 2 a plan view, of my improved apparatus. Figs. 3 and 4 are detail views.

The frame of the apparatus consists of an H shaped base, A, and two parallel uprights or vertical standards, B B, which are connected at the top by a link or bar, a. The base is provided with a number of mortises to receive the tenons of the uprights, through slots in which keys b are inserted for locking the parts together. This construction permits adjustment of the uprights lengthwise of the base, as occasion requires.

The heads of the base A are provided with a deep rabbet or recess, c, and the tub D may be connected with either by means of a dowel-pin, e, Fig. 3.

The means for raising the carcass of the hog, bullock, or other animal consists of a rope, E, and a windlass, F, which is located between the bases of the uprights B, and provided with a locking pawl-and-ratchet mechanism. The rope E passes over a pulley, f, in the top of one of the uprights, and a pulley, g, journaled in the outer end of a horizontal bar, G, which is inserted in slots or mortises in the uprights. Another bar, H, having upwardly-curved ends, is similarly secured in the uprights below the pulley-bar.

Hooks g' g' are attached to the outer or free end of the rope, and may be readily attached to, or detached from, the gambrel I. When a hog is to be scalded and dressed the gambrel I is inserted in slits cut in the hind legs, as usual, and the hooks g are connected with it. The windlass F is then rotated and the carcass raised into the tub D. When sufficiently scalded it is drawn up to allow the cover K to be placed on the tub, when the carcass is again lowered upon said cover, which thus forms a platform whereon the carcass may be conveniently scraped. It likewise prevents escape of steam and rapid radiation of heat from the water in the tub.

The next step in the operation is to elevate the carcass until the gambrel I comes in contact with the upwardly-curved end of bar H, and, passing over said end, rests upon the upper side of the bar, as shown in Fig. 1. The rotation of the windlass is then arrested, and the bar H will continue to support the carcass until the dressing operation has been completed.

The bars G and H are secured in position by pins i, and may be adjusted or placed on the opposite side of the uprights. In such case the pulley f will be also changed to the right-hand upright, and the rope E transferred to a corresponding position.

A carcass may, however, be left suspended from bar H, and a similar bar used with the pulley-bar G on the other side of the uprights, so that the dressing operation may be completed by one gang of hands, while a second carcass is being scalded and scraped by another.

It is practicable to use a long bar projecting either way from the uprights, in place of the short bar H.

In some cases the tub D will be connected to a platform, L, having dowel k, and that, in turn, with the base A, as shown in Figs. 1, 2; but the tub may, instead, be connected directly to the base A, as shown in Fig. 3. But when the platform intervenes the uprights may be adjusted nearer that end of the base A to which the said platform is connected. The latter is particularly serviceable for the butchers to stand upon (when the carcass has been hoisted) to complete the dressing operation.

Of course, this platform will alone be used when a bullock is being skinned and dressed.

What I claim is—

The improved slaughtering apparatus formed of the tub D, platform L, and base A, connected as specified, the uprights B, bars G H, and rope and windlass, all arranged as shown and described.

GEORGE WHEELER.

Witnesses:
H. D. SPRAGUE,
B. G. SMYTHE.